No. 672,433.  
Patented Apr. 23, 1901.
H. C. ARNAMAN & H. L. LORING
SOLDERING IRON.
(Application filed Aug. 4, 1900.)
(No Model.)
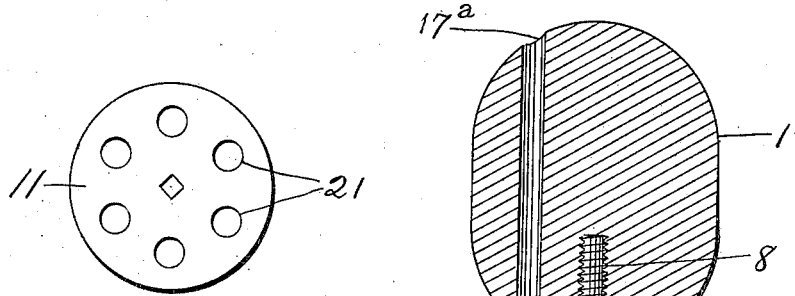
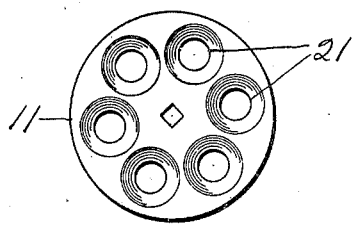
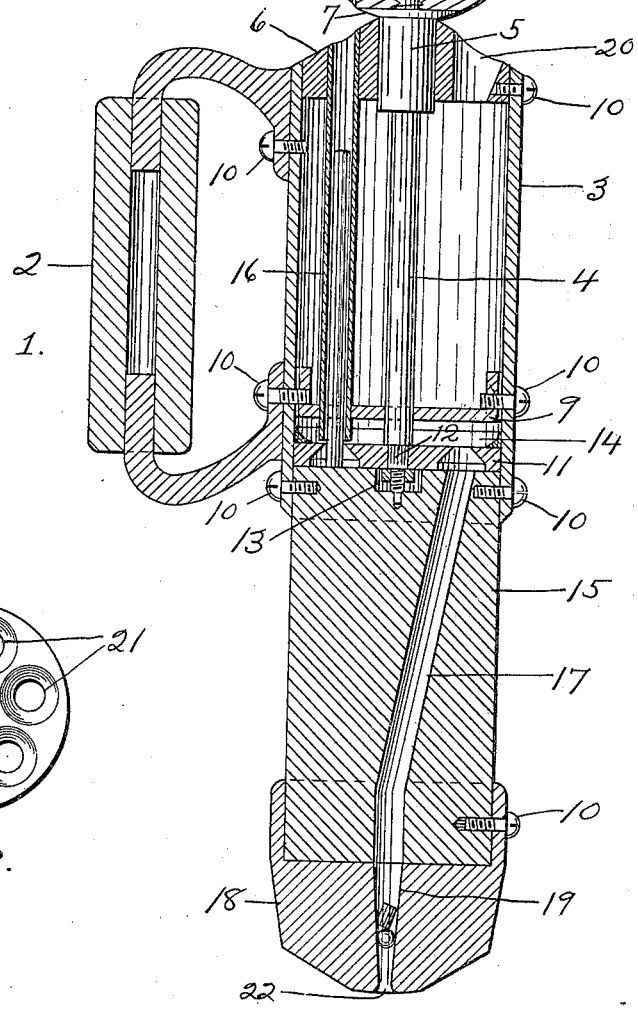
WITNESSES,  
K. M. Imboden  
M. L. Lange.
INVENTORS,  
H. L. Loring and H. C. Arnaman.  
BY Higdon & Higdon  
ATT'YS.
THE NORRIS PETERS CO., PHOTO-LITHO., WASHINGTON, D. C.

UNITED STATES PATENT OFFICE.

HARRY C. ARNAMAN AND HENRY L. LORING, OF KANSAS CITY, MISSOURI.

SOLDERING-IRON.

SPECIFICATION forming part of Letters Patent No. 672,433, dated April 23, 1901.

Application filed August 4, 1900. Serial No. 25,866. (No model.)

*To all whom it may concern:*

Be it known that we, HARRY C. ARNAMAN and HENRY L. LORING, citizens of the United States, and residents of Kansas City, county of Jackson, and State of Missouri, have invented new and useful Improvements in Soldering-Irons, of which the following is a specification.

Our invention relates to soldering-irons or a machine peculiarly adapted to soldering the vent-opening in the ends of tin cans which is made for the discharge of the surplus steam in all heated canned fruits.

To this end our invention consists in certain peculiarities and combinations, which will hereinafter be fully described.

We have shown our invention constructed mainly to be manipulated by hand-power. At the same time we claim the right to provide means so that it can be readily manipulated by mechanical power, which can be readily accomplished by providing the rim of the disk with ratchet-teeth and by means of a suitable pawl to force it around from opening to opening, which we will further refer to later on, but will now proceed to describe our invention with reference to the drawings by referring to corresponding numerals thereon, of which—

Figure 1 is a vertical sectional view of our invention in full size. Fig. 2 is a plan view of the lower face of the cutting-disk detached. Fig. 3 is a plan view of the upper or cutting face of the same.

In practice handle 1 is grasped in one hand and handle 2 in the other hand.

3 is a shot-receptacle, which in practice is filled sufficiently full of soldering-shot. Passing vertically through said receptacle is a shaft 4. Said shaft 4 extends upward and is provided with a swell portion 5. Said swell portion 5 works loosely through the head 6 of said receptacle and is provided with a flange 7, upon which handle 1 rests. Said shaft is also provided with an upward extension 8, which is screw-threaded and is screwed firmly into handle 1. The lower end of said shaft 4 passes downward through a bridge-piece 9, said bridge-piece being screwed to the inner walls of the receptacle by means of screws 10. Said shaft further extends downward below said bridge-piece through a square opening 12 in disk 11 and still further extends into a seat 13, made in the upper end of a solid piece of suitable metal to be heated for melting the solder, &c., where it is provided with a screw-threaded nut that secures it to said disk 11. Said receptacle is also provided with a circular rim 14, as shown, the object of which is to form a guide to hold the disk in its proper relation to the heating-body substance 15. It will further be observed that we have provided a tube or sleeve 16, which extends vertically through said receptacle 3, the upper end of which is secured to the head of the receptacle, and the lower end is secured by passing through bridge-piece 9 and extending downward as near as possible without touching the disk 11. The object of said tube or sleeve is to receive a small round bar of solder which can be used for soldering purposes with our invention as well as shot. Said bar is inserted into said tube 16 through a corresponding opening $17^a$ in handle 1, as shown. The lower end of said tube correspondingly stands over the openings in said disk 11, so that when in practice the manipulator turns the handle, which at the same time rotates the disk, and when each opening through said disk comes fair with the end of said tube or sleeve the bar of metal drops through said opening and rests upon the upper end of the heating-body 15. With a slight wrenching turn of the handle when the bar is in this position the end is clipped or cut off by means of the sharpened edges of the openings 21 in the disk, and the same is repeated at each turn until the cut-off ends are carried around over bore 17, made through the heating-body substance 15, as shown, when it automatically discharges itself and drops downward to the position as indicated in the detachable end 18 of the heating-body portion, where it lodges and remains until melted, which is almost instantaneous on account of being subjected to the intense heat. The molten solder then settles to the extreme lower end of the diverging bore 19 and discharges when it comes in contact with the objects to be soldered.

The detachable tip 18 referred to is provided with a conical or diverging bore 19, the upper end of which correspondingly engages bore 17 of the heating-body portion 15. It will be further observed that the mouth or lower end 22 of the diverging bore is flaring, the object of which is to admit the molten solder to more readily adjust itself in practice.

Another object of the detachable tip is that when it wears or burns out, which it does, being more exposed to the intense heat than the body portion, it can be removed and a new one adjusted. All of the parts of the invention are secured in an operative position, as seen, by a suitable number of screws, (indicated at 10.) The upper head of said receptacle is also provided with an opening 20 to admit shot.

From the above description it is apparent that we have produced a soldering-iron which shall be effective, easy of construction and manipulation, and susceptible of long durability.

Having thus fully described our invention, what we claim as new, and desire to secure by Letters Patent of the United States, is—

1. A soldering-iron comprising a shot receptacle or magazine, a handle-retaining shaft extending vertically through said magazine, a bar-receiving sleeve stationary within said receptacle, and a handle secured to the outer end of said shaft, substantially as described.

2. A soldering-iron, comprising a shot receptacle or magazine, a handle-retaining shaft extending vertically through said magazine, a disk secured to said handle-retaining shaft, a supporting bridge-piece secured to the walls of the receptacle, substantially as described.

3. A soldering-iron, comprising a shot receptacle or magazine, a circular retaining-rim secured to the inner walls of the magazine, a detachable body-heating substance, a bore through said substance, substantially as described.

4. A soldering-iron comprising a shot receptacle or magazine, a handle-retaining shaft, extending longitudinally through said magazine, a heating-body detachably secured to the lower end of said magazine, a circular disk secured centrally on said shaft near its lower end and resting on the top of the heating-body, openings through the disk at equal distances from the shaft, a bore passing through said heating-body so as to register with any one of said openings, a detachable tip having an annular flange secured to the lower end of the heating-body; and a perforation through said tip, communicating with said bore; substantially as described.

In testimony whereof we affix our signatures in the presence of two witnesses.

HARRY C. ARNAMAN.
HENRY L. LORING.

Witnesses:
M. L. LANGE,
M. N. HIGDON.